(12) United States Patent
Takeuchi

(10) Patent No.: US 11,475,127 B2
(45) Date of Patent: Oct. 18, 2022

(54) INFORMATION PROCESSING DEVICE AND INFORMATION PROCESSING METHOD

(71) Applicant: NIPPON TELEGRAPH AND TELEPHONE CORPORATION, Tokyo (JP)

(72) Inventor: Kaku Takeuchi, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 71 days.

(21) Appl. No.: 17/044,790

(22) PCT Filed: Mar. 18, 2019

(86) PCT No.: PCT/JP2019/011060
§ 371 (c)(1),
(2) Date: Oct. 1, 2020

(87) PCT Pub. No.: WO2019/193958
PCT Pub. Date: Oct. 10, 2019

(65) Prior Publication Data
US 2021/0117536 A1 Apr. 22, 2021

(30) Foreign Application Priority Data
Apr. 4, 2018 (JP) .............................. JP2018-072562

(51) Int. Cl.
*G06F 21/55* (2013.01)

(52) U.S. Cl.
CPC ...... *G06F 21/552* (2013.01); *G06F 2221/034* (2013.01)

(58) Field of Classification Search
CPC . G06F 21/552; G06F 2221/034; G06F 21/554
See application file for complete search history.

(56) References Cited

U.S. PATENT DOCUMENTS 9,948,663 B1 *  4/2018  Wang .................. H04L 63/1416
10,382,473 B1 *  8/2019  Ashkenazy ......... H04L 63/1466
(Continued)

FOREIGN PATENT DOCUMENTS

JP          2014106855         6/2014
WO     WO 2019/003373 A1 *   1/2019   ............. G06F 21/55
WO     WO 2020/193333 A1 *  10/2020   ............. G06F 21/55

*Primary Examiner* — Christopher A Revak

(57) ABSTRACT

Attack cases (for example, including attack details, countermeasures, and the like) of each device forming each attack path are derived by comprehensively extracting attack paths assumed for a target system. An information processing device D includes: an input unit (1) configured to read a list of a device group included in a system and a list of connection relations between devices; an attack path extracting unit (2) configured to extract an attack path on the basis of the list of the device group and the list of the connection relations read by the input unit (1); an attack case DB unit (3) configured to store a past attack case in association with an attack phase and a node condition at a time when the attack case occurred; an attack case search unit (4) configured to determine an attack phase and a node condition of each device serving as each node configuring the attack path extracted by the attack path extracting unit (2) and acquire an attack case corresponding to each device by searching the attack case DB unit (3) using the determined attack phase and the determined node condition; and an output unit (5) configured to output a result of the search.

20 Claims, 8 Drawing Sheets

| ATTACK PHASE | NODE CONDITION | ATTACK CASE | | ... |
|---|---|---|---|---|
| | | ATTACK DETAIL | COUNTERMEASURE | |
| INTRUSION POINT | · P C<br>· CONNECT TO NW<br>· · · | · IDENTIFY PASSWORD BY ATTEMPTING UNAUTHORIZED LOGIN SUCH AS BRUTE FORCE ATTACK ON LOGIN SCREEN OF PC AND INTRUDE INTO DEVICE<br>... | · PERFORM ROBUST PASSWORD MANAGEMENT<br>· INTRODUCTION OF AUTHENTICATION METHOD USING CERTIFICATE<br>· INTRODUCTION OF MULTICOMPONENT AUTHENTICATION<br>· DETECTION THROUGH MONITORING OF ACCESS LOG<br>... | · · · |
| · · · | · · · | · · · | · · · | · · · |
| ATTACK BASE | · SERVER<br>· CONNECT TO NW<br>· · · | · DOWNLOAD MALWARE USING VARIOUS COMMANDS OF SERVER OS AND INFECT DEVICE<br>· CAUSE DEVICE TO TRANSMIT UNAUTHORIZED COMMAND TO OTHER DEVICE<br>... | · INTRODUCTION OF ANTIVIRUS SOFTWARE<br>· LIMIT UNNECESSARY COMMUNICATION BETWEEN DEVICES USING FW OR THE LIKE<br>· DETECTION USING MONITORING LOG<br>... | |
| · · · | · · · | · · · | · · · | · · · |
| ATTACK TARGET | · D B<br>· CONNECT TO NW<br>· · · | · PERFORM STEALING/ALTERATION/DELETION OF DATA STORED INSIDE DB BY ATTEMPTING UNAUTHORIZED SEARCH QUERY<br>... | · BLOCK UNAUTHORIZED ACCESS USING WAF<br>· PERFORM PERIODIC BACKUP OF INPUT DATA<br>... | |
| · · · | · · · | · · · | · · · | · · · |

(56) References Cited

U.S. PATENT DOCUMENTS

| | | | | |
|---|---|---|---|---|
| 10,616,270 | B2* | 4/2020 | Hu | G06F 13/00 |
| 2015/0248559 | A1* | 9/2015 | Madou | H04L 63/1433 |
| | | | | 726/25 |
| 2016/0301704 | A1* | 10/2016 | Hassanzadeh | H04L 63/0227 |
| 2018/0159868 | A1* | 6/2018 | Lai | H04L 9/3297 |
| 2018/0349612 | A1* | 12/2018 | Harel | G06F 21/54 |

* cited by examiner

| ATTACK PHASE | NODE CONDITION | ATTACK CASE | |
|---|---|---|---|
| | | ATTACK DETAIL | COUNTERMEASURE |
| INTRUSION POINT | • P C<br>• CONNECT TO NW<br>• ... | • IDENTIFY PASSWORD BY ATTEMPTING UNAUTHORIZED LOGIN SUCH AS BRUTE FORCE ATTACK ON LOGIN SCREEN OF PC AND INTRUDE INTO DEVICE<br>• ... | • PERFORM ROBUST PASSWORD MANAGEMENT<br>• INTRODUCTION OF AUTHENTICATION METHOD USING CERTIFICATE<br>• INTRODUCTION OF MULTICOMPONENT AUTHENTICATION<br>• DETECTION THROUGH MONITORING OF ACCESS LOG<br>• ... |
| ... | ... | ... | ... |
| ATTACK BASE | • SERVER<br>• CONNECT TO NW<br>• ... | • DOWNLOAD MALWARE USING VARIOUS COMMANDS OF SERVER OS AND INFECT DEVICE<br>• CAUSE DEVICE TO TRANSMIT UNAUTHORIZED COMMAND TO OTHER DEVICE<br>• ... | • INTRODUCTION OF ANTIVIRUS SOFTWARE<br>• LIMIT UNNECESSARY COMMUNICATION BETWEEN DEVICES USING FW OR THE LIKE<br>• DETECTION USING MONITORING LOG<br>• ... |
| ... | ... | ... | ... |
| ATTACK TARGET | • D B<br>• CONNECT TO NW<br>• ... | • PERFORM STEALING/ALTERATION DELETION OF DATA STORED INSIDE DB BY ATTEMPTING UNAUTHORIZED SEARCH QUERY<br>• ... | • BLOCK UNAUTHORIZED ACCESS USING WAF<br>• PERFORM PERIODIC BACKUP OF INPUT DATA<br>• ... |
| ... | ... | ... | ... |

Fig. 7

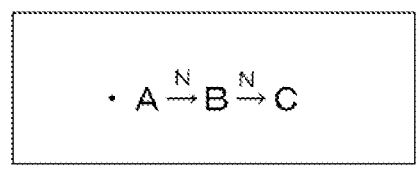
Fig. 8
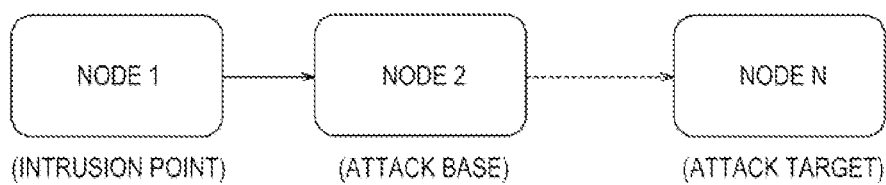
Fig. 9
| | ATTACK PHASE | NODE CONDITION |
|---|---|---|
| A | INTRUSION POINT | · P C<br>· CONNECT TO NW<br>... |
| B | ATTACK BASE | · SERVER<br>· CONNECT TO NW<br>... |
| C | ATTACK TARGET | · D B<br>· CONNECT TO NW<br>... |
Fig. 10

| | ATTACK PHASE | NODE CONDITION | ATTACK CASE | |
|---|---|---|---|---|
| | | | ATTACK DETAIL | COUNTERMEASURE |
| A | INTRUSION POINT | • PC<br>• CONNECT TO NW<br>... | • IDENTIFY PASSWORD BY ATTEMPTING UNAUTHORIZED LOGIN SUCH AS BRUTE FORCE ATTACK ON LOGIN SCREEN OF PC AND INTRUDE INTO DEVICE | • • • |
| B | ATTACK BASE | • SERVER<br>• CONNECT TO NW<br>... | • DOWNLOAD MALWARE USING VARIOUS COMMANDS OF SERVER OS AND INFECT DEVICE<br>• CAUSE DEVICE TO TRANSMIT UNAUTHORIZED COMMAND TO OTHER DEVICE | • • • |
| C | ATTACK TARGET | • DB<br>• CONNECT TO NW<br>... | • DATA STORED INSIDE DB IS STOLEN/ALTERED/DELETED BY ATTEMPTING UNAUTHORIZED SEARCH QUERY | • • • |

Fig. 11

INFORMATION PROCESSING DEVICE AND INFORMATION PROCESSING METHOD

CROSS-REFERENCE TO RELATED APPLICATIONS

This application is a U.S. 371 Application of International Patent Application No. PCT/JP2019/011060, filed on 18 Mar. 2019, which application claims priority to and the benefit of JP Application No. 2018-072562, filed on 4 Apr. 2018, the disclosures of which are hereby incorporated herein by reference in their entireties.

TECHNICAL FIELD

The present disclosure relates to a technique for analyzing an assumed threat to a system.

BACKGROUND ART

In recent years, chain attacks such as malware, which spread across a group of devices inside a system, have increased. Hereinafter, a route of such a chain attack over a group of devices will be referred to as an "attack path". In order to prepare for such attacks, it is necessary to ascertain the details of each attack which may occur in each device and is connected to an attack path and take countermeasures for them. In order to acquire the security of an information system, techniques for analyzing various threats are known (Patent Literature 1).

CITATION LIST

Patent Literature

Patent Literature 1: Japanese Unexamined Patent Application Publication No. 2014-106855

SUMMARY OF THE INVENTION

Technical Problem

The analysis techniques described above analyze threats to individual devices. Thus, they are only fragments of the attack path. Such techniques cannot identify a sequential attack path from fragmentary threats. Specialized knowledge is required to realize that an attack that has occurred in a device A may lead to an attack that occurs in a device B in a chain manner and to identify a sequential attack path. In addition, specialized knowledge is also required for comprehensively extracting devices, inside a target system, from which attack paths may be generated.

An object of the present disclosure in view of above problems is to provide an information processing device that can comprehensively extract attack paths assumed in a target system and derive attack cases for each device forming each attack path (including attack details, and countermeasures, for example).

Means for Solving the Problem

In order to solve the problems described above, an information processing device according to the present disclosure includes:

an input unit configured to read a list of a device group included in a system and a list of connection relations between devices;

an attack path extracting unit configured to extract an attack path on the basis of the list of the device group and the list of the connection relations read by the input unit;

an attack case DB unit configured to store a past attack case in association with an attack phase and a node condition at a time when the attack case occurred;

an attack case search unit configured to determine an attack phase and a node condition of each device serving as each node configuring the attack path extracted by the attack path extracting unit and acquire an attack case corresponding to each device by searching the attack case DB unit using the determined attack phase and the determined node condition; and an output unit configured to output a result of the search.

In addition, in order to solve the problems described above, an information processing method according to the present disclosure includes:

by an input unit, reading a list of a device group and a list of connection relations between devices included in a system;

by an attack path extracting unit, extracting an attack path on the basis of the list of the device group and the list of the connection relations read by the input unit;

by an attack case DB unit, storing a past attack case in association with an attack phase and a node condition at a time when the attack case occurred;

by an attack case search unit, determining an attack phase and a node condition of each device configuring the attack path extracted by the attack path extracting unit and acquiring an attack case corresponding to each device by searching the attack case DB unit using the determined attack phase and the determined node conditions; and by an output unit, outputting a result of the search.

Effects of the Invention

According to an information processing device and an information processing method according to the present disclosure, comprehensive extraction of attack paths assumed for a target system and deriving of attack cases (for example, including attack details, countermeasures, and the like) of each device forming each attack path can be performed.

BRIEF DESCRIPTION OF DRAWINGS

FIG. 7 is a diagram illustrating a data configuration of an attack case DB unit according to the embodiment.

FIG. 8 is a diagram illustrating an attack path according to the embodiment.

FIG. 9 is a diagram in which an attack phase and node conditions according to the embodiment are associated with each other.

FIG. 10 is a diagram illustrating a method of determining an attack phase of each node according to the embodiment.

FIG. 11 is a diagram illustrating an attack case search result according to the embodiment.

DESCRIPTION OF EMBODIMENTS

Figure 1:
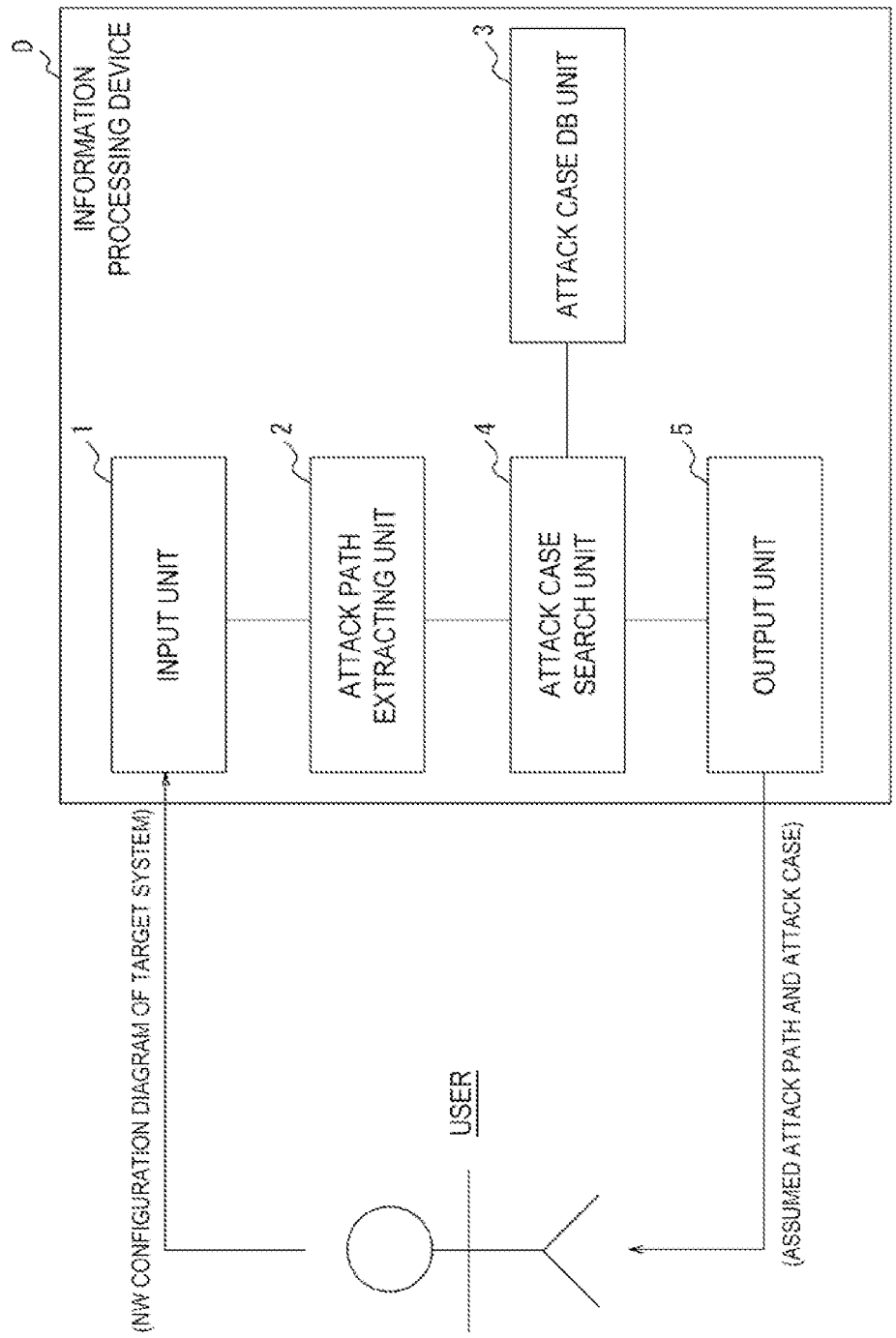
FIG. 1 is a functional block diagram of an information processing device according to the embodiment.

FIG. 1 is a functional block diagram illustrating an information processing device D according to the embodiment. The information processing device D includes an input unit 1, an attack path extracting unit 2, an attack case DB unit 3, an attack case search unit 4, and an output unit 5. An arbitrary user inputs a network (NW) configuration diagram of a target system that becomes a target for a threat analysis to the input unit 1. An arbitrary user acquires an assumed attack path and attack cases from the output unit 5. Details will be described below. Hereinafter, although each function of the information processing device D will be described, the other functions included in the information processing device D are not intended to be excluded.

The processes executed by the input unit 1, the attack path extracting unit 2, the attack case search unit 4, and the output unit 5 are executed by one or a plurality of processors (not illustrated). The processor may include one or a plurality of memories that store programs for various processes and information during calculation. The memory includes a volatile memory and a nonvolatile memory. The memory includes a memory that is independent of the processor and a built-in memory of the processor. The processor includes a general-purpose processor that executes a specific function by causing a specific program to be read and a dedicated processor that is dedicated to a specific process. The attack case DB unit 3 is composed of a semiconductor memory, a magnetic memory, or the like and can store various kinds of information and/or a program for operating the information processing device D, and the like. The attack case DB unit 3 may function also as a work memory.

Figure 2:
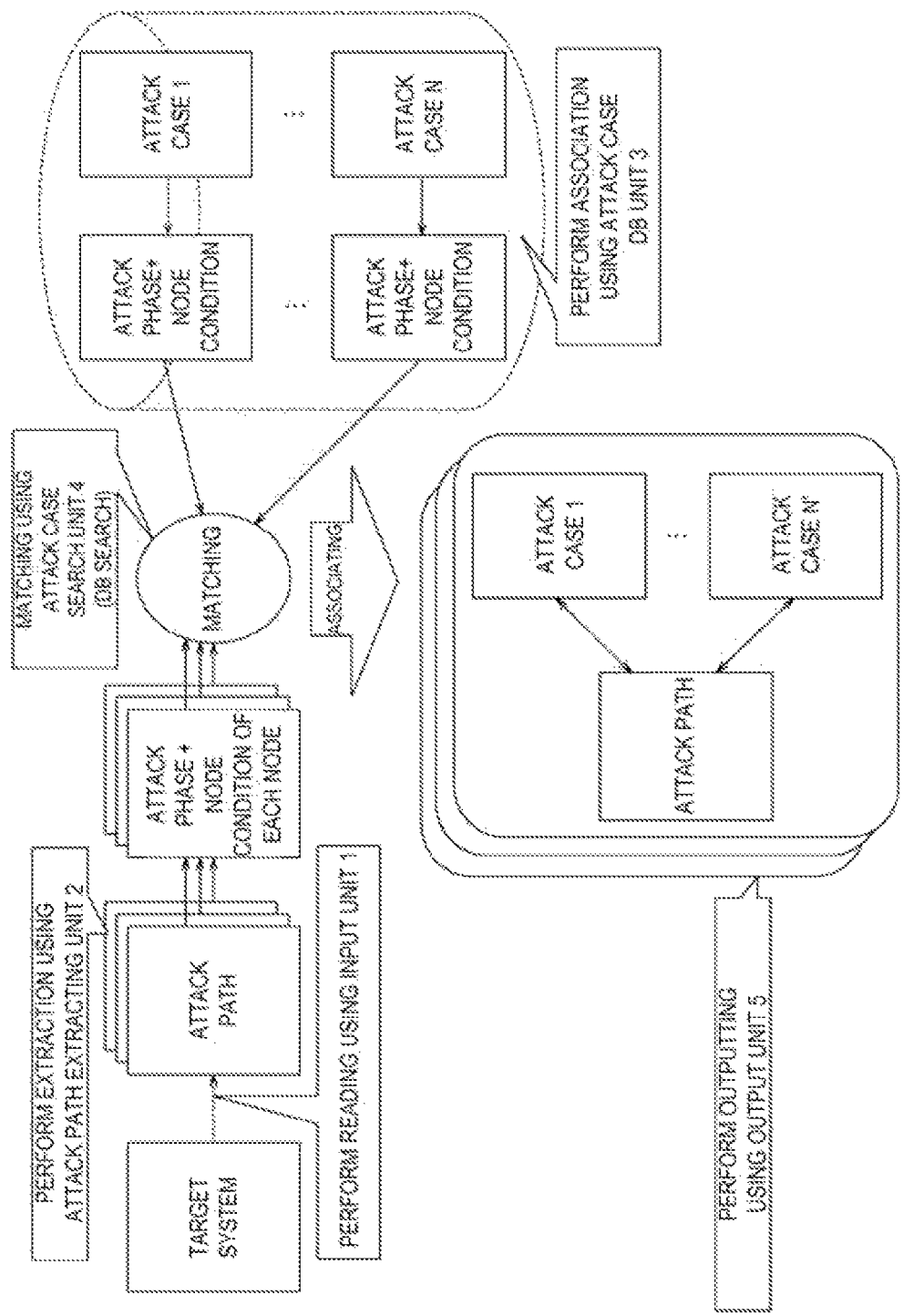
FIG. 2 is a diagram illustrating an overview of a data flow according to the embodiment.

An overview of a data flow according to the embodiment will be described with reference to FIG. 2.

The input unit 1 reads a list of a device group included in a target system and a list of connection relations between devices from network configuration information of the target system that has been input by a user. As an example, the input unit 1 reads a network configuration diagram and the like of a target system and extracts a list of a device group such as a terminal device, a server apparatus, a communication device, and the like included in the target system and a list of connection relations between devices in a communication line and the like between devices.

The attack path extracting unit 2 comprehensively extracts attack paths by performing a route search on a graph with the list of a device group and the list of connection relations between devices read by the input unit 1 serving as graph data in a graph theory.

The attack case DB unit 3 stores each past attack case in association with an attack phase and node conditions at a time when the attack case occurred. The past attack case may be input by an arbitrary user or may be downloaded from a site that provides vulnerability reports and the like.

For each attack path extracted by the attack path extracting unit 2, the attack case search unit 4 determines an attack phase of a device serving each node configuring the attack path on the basis of a position of the device in the attack path. In addition, the attack case search unit 4 determines node conditions on the basis of a type, a connection relation with other devices, and the like of the device. The attack case search unit 4 performs matching by searching the attack case DB unit 3 using a search expression including the attack phase and the node conditions that have been determined, thereby acquiring attack cases corresponding to each device.

The output unit 5 generates a result obtained by associating an attack path with attack examples of a device serving as each node, using a table or the like for example, as a report and outputs the report. The output is performed, for example, by displaying the report on a display unit of the information processing device D.

Hereinafter, details of a process executed by the information processing device D according to the embodiment at any time point will be described with reference to the process of the information processing method illustrated in FIG. 3.

Figure 3:
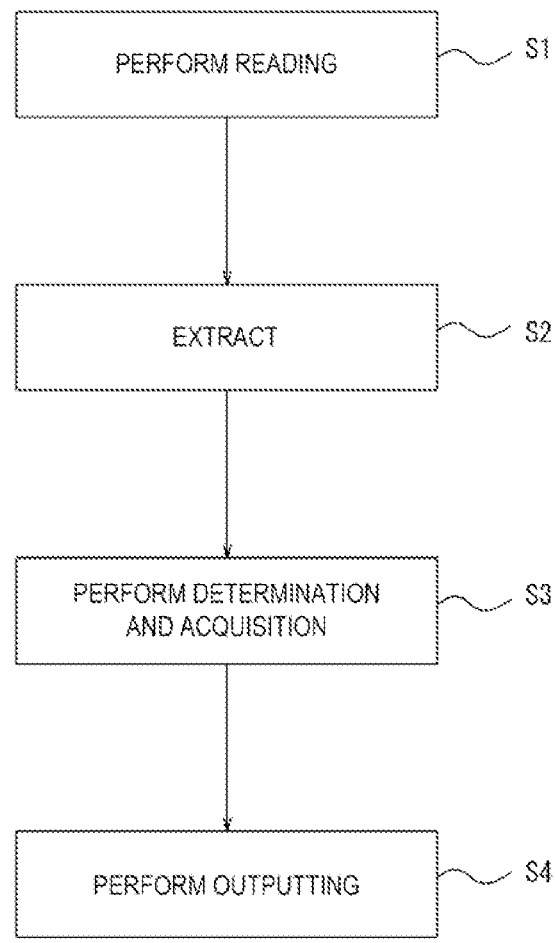
FIG. 3 is a flowchart of a process executed by an information processing device according to the embodiment.

In step S1 illustrated in FIG. 3, the input unit 1 receives an input such as network configuration information and the like of a target system and reads a list of a device group included in the target system and a list of connection relations between devices.

Figure 4:
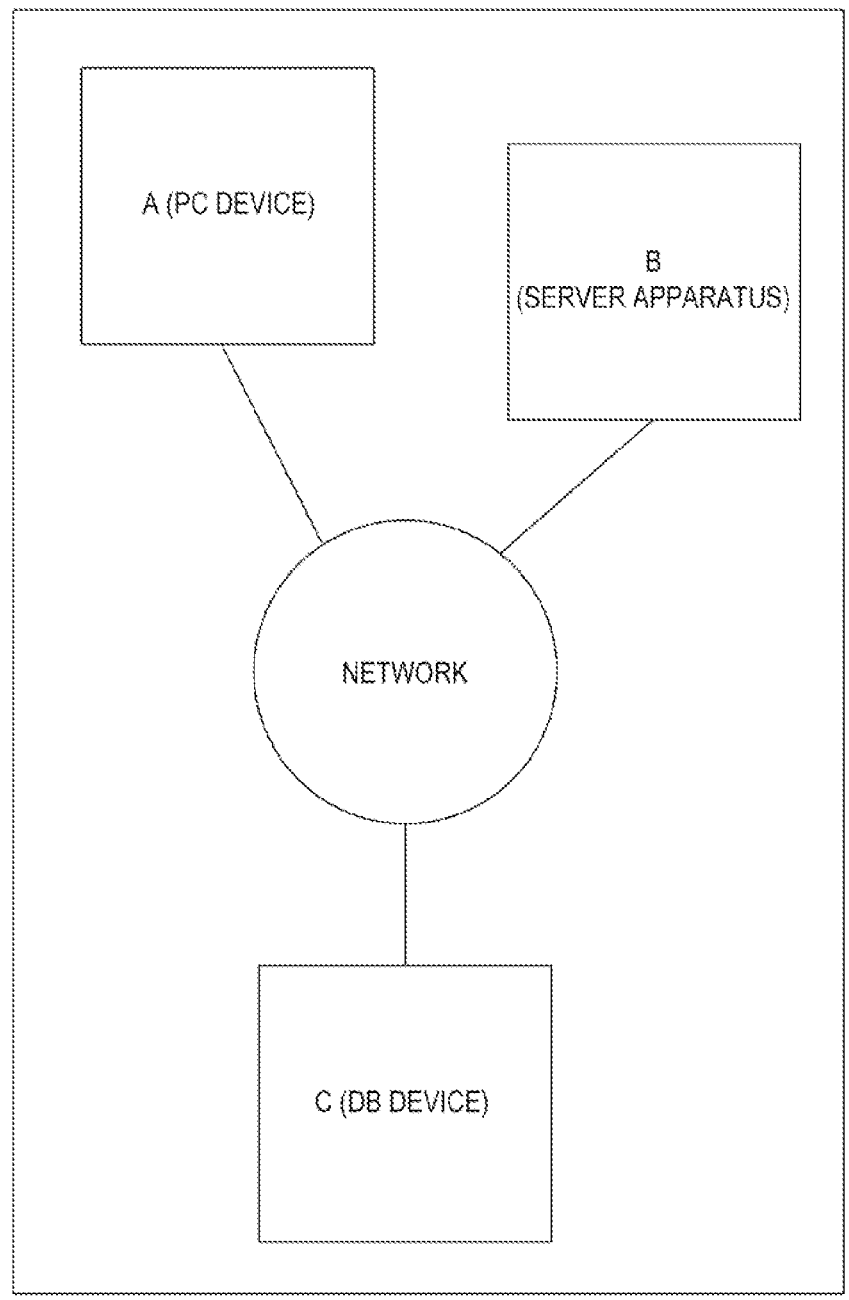
FIG. 4 is a diagram illustrating network configuration information according to the embodiment.
Figure 5:
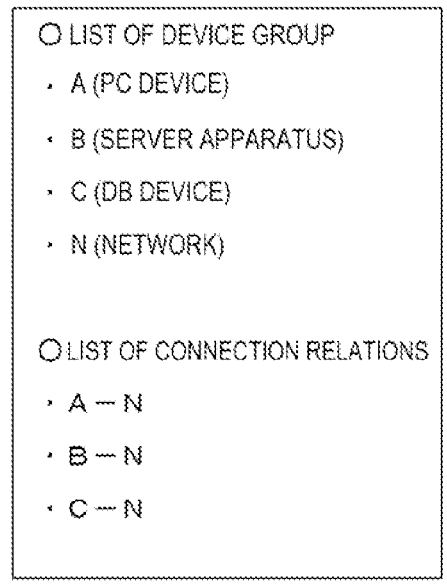
FIG. 5 is a diagram illustrating a list of a device group and a list of connection relations according to the embodiment.

FIG. 4 illustrates one example of network configuration information which the input unit 1 may accept as an input. FIG. 4 indicates that devices A, B, and C are connected via a network N. The network configuration information may be input by a user. For example, the network configuration information may include an XML document created using a draw tool or the like. FIG. 5 illustrates a list of a device group included in a target system and a list of connection relations between devices. Identification information used for identifying each device is associated with the device. Such identification information and any information relating to the device (for example, a type, asset information, or the like of the device) may be associated with each other.

Figure 6:
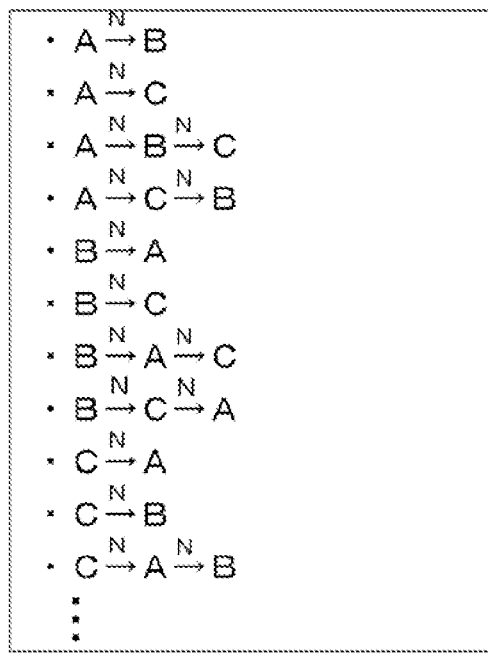
FIG. 6 is a diagram illustrating an attack path list according to the embodiment.

In step S2 illustrated in FIG. 3, the attack path extracting unit 2 of the information processing device D searches for all the routes connecting one device with another device via a network with a list of a device group and a list of connection relations between devices read by the input unit 1 serving as graph data of a graph theory, thereby comprehensively extracting attack paths. For example, various route search techniques of a graph theory may be applied to the route search. The route search includes a search for the shortest route not including a circulation (loop) and the like. One example of a list of attack paths is illustrated in FIG. 6. For example,

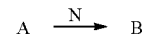

illustrated in FIG. 6 represents that an attacker attacks a device B from a device A via a network N.

The attack path extracting unit 2 according to the embodiment extracts an attack path as a route between devices via a network. However, a device, due to software running on the device, can be logically regarded as a network in some cases. In a case in which software such as a proxy, a gateway, or the like operates on a device, the attack path extracting unit 2 may alternatively extract an attack path as a route between other devices via the device.

Before description of step S3 illustrated in FIG. 3, the configuration of the attack case DB unit 3 that stores information to be referred in step S3 will be described.

The attack case DB unit 3, as illustrated in FIG. 7, stores an attack phase at a time when an attack detail of a past attack case occurred in association with node conditions. The attack phase includes at least one of an intrusion point, an attack base, and an attack target. Details of these terms are as follows.

"Intrusion point": a device or the like where the intrusion happens when an attacker performs an attack.

"Attack base": a device or the like through which the intruding attacker passes before it reaches an attack target or a device or the like that can execute an attack (transmit a command or the like) against an attack target (for example, a device such as a server, a load balance, a firewall, or a router that is infected with malware).

"Attack target": a device or the like for which destruction, information theft, alteration, or the like is performed through an attack.

The "node conditions" described above may be any information relating to a device and, for example, is a type of device, presence/absence of connection to a network, or the like. In a case in which configuration management relating to a device is performed in advance, and a type, information of physical resources relating to hardware, information of logical resources relating to software such as an application or middleware, which is used, and the like of each device are managed using a DB or the like, the attack case DB unit 3 may use such information as node conditions.

The description of step S3 illustrated in FIG. 3 will be continued. The attack case search unit 4 executes the following processing for all the attack paths extracted by the attack path extracting unit 2. In other words, when attack path information, for example, illustrated in FIG. 8 is received from the attack path extracting unit 2, the attack case search unit 4 may determine an attack phase of each node on the basis of the position of each node within the attack path. More specifically, as illustrated in FIG. 9, the attack case search unit 4 may determine node 1, which is a first node, as an intrusion point, nodes 2 to (N−1), which are middle nodes, as attack bases, and node N, which is an end node, as an attack target. Next, as illustrated in FIG. 10, the attack case search unit 4 extracts an attack phase and node conditions of each node. Next, the attack case search unit 4 searches the attack case DB unit 3 using the attack phase and the node conditions that have been extracted and searches for attack cases relating to each node. FIG. 11 illustrates an example of a search result.

In step S4 illustrated in FIG. 3, the output unit 5 generates the search result of step S3 as a report, for example, using a table and outputs the report. For example, from the search result illustrated in FIG. 11, a scenario of an attack as follows can be checked.

A password is identified by attempting unauthorized login on a login screen of a device A, and the device is intruded.

Malware is downloaded from the device A to a device B to infect the device B.

By transmitting an unauthorized command from the device B to a device C, a command of an unauthorized search query attempt is transmitted, and data is stolen, altered, or removed.

As described above, according to the embodiment, the attack path extracting unit 2 of the information processing device D extracts attack paths on the basis of a list of a device group and a list of connection relations read by the input unit 1. For this reason, attack paths that are assumed for a target system can be comprehensively extracted. In addition, the attack case search unit 4 of the information processing device D determines an attack phase and node conditions of each device that serves as each node configuring an attack path extracted by the attack path extracting unit 2 and acquires attack cases corresponding to each device by searching the attack case DB unit 3 using the determined attack phase and the determined node conditions. For this reason, attack cases, which may include attack details and countermeasures, of each device leading to an attack path can be acquired. Thus, preparation for attack paths can be made without support from a security expert.

In addition, according to the embodiment, the attack case search unit 4 determines an attack phase on the basis of a position of a device in an attack path. For this reason, the attack phase of each device can be accurately determined.

Furthermore, according to the embodiment, the attack case search unit 4 determines node conditions on the basis of a type of each device and a relation of each device with another device. For this reason, node conditions of each device can be accurately determined.

In addition, according to the embodiment, an attack case includes an attack detail and a countermeasure for the attack detail. For this reason, the preparation for attack paths can be even more sufficient.

Furthermore, according to the embodiment, the information processing device D further includes the output unit 5 that outputs the acquired attack cases as a report including a table. For this reason, a method for preparing an attack path can be more easily understood.

In addition, according to the embodiment, the attack phase includes at least one of an intrusion point, an attack base, and an attack target at the time of an attack. In other words, because the attack phases are sub-divided, a preparation for attack paths can be separately performed for each device, and a preparation for attack paths can be even more sufficient.

In addition, according to the embodiment, the attack path extracting unit 2 extracts attack paths by executing a route search on a graph by regarding the read lists as graph data in a graph theory. For this reason, attack paths are less likely to be missed, and a preparation for attack paths can be even more sufficient.

The embodiment described above is one example. It is apparent for those skilled in the art that many changes and substitutions can be made to the embodiment within the spirit and the scope of the invention. Therefore, the present disclosure should not be construed as being limited by the embodiments described above, and various modifications and changes can be made without departing from the claims. For example, a plurality of constituent blocks illustrated in the configuration diagram according to the embodiment may be combined into one block, or one constituent block may be divided.

In a case in which the information processing device D is configured by a computer, the computer may be caused to function by storing a program describing details of the processing realizing each function in a storage means disposed inside or outside the computer and reading and executing the program using a central processing unit (CPU) of the computer. Such a program can be distributed by, for example, selling, transferring, or renting a portable recording medium such as a DVD, a CD-ROM, or the like, and also can be distributed by storing the program, for example, in a storage unit of a server present on a network and transmitting the program from the server to another computer via a network. In addition, for example, a computer executing such a program may temporarily store a program recorded on a portable recording medium or a program transferred from a server in its own storage unit. In addition, as another embodiment of this program, a computer may read the program directly from a portable recording medium and execute processing according to the program. Furthermore, as another embodiment of this program, when a program is transferred from a server to this computer, a process according to a received program may be sequentially executed.

REFERENCE SIGNS LIST

D Information processing device
1 Input unit
2 Attack path extracting unit
3 Attack case DB unit
4 Attack case search unit
5 Output unit

The invention claimed is:

1. A computer-implemented method for determining aspects of a security attack on a computer, the method comprising:
   receiving a first list of devices and a second list of connection relations among the devices;
   determining, based on the received first list of devices and the received second list of connection relations, an attack path;
   storing one or more previous attack paths as at least a part of attack cases in an attack case database, wherein the attack case database associates at least one of the one or more previous attack paths with an attack phase and a node condition at a time of the security attack;
   determining the attack phases and the node conditions of the devices, wherein each of the attack paths comprises a node representing one of the devices;
   retrieving, based on a search in the attack case database using the determined attack phases and the determined node conditions, an attack case associated with the security attack, wherein the attack case relates to one or more of the devices, wherein the determined attack phases include a combination of at least an intrusion point and an attack target, and wherein the attack case includes descriptions of the security attack and a countermeasure for the security attack; and
   providing the retrieved attack case as output.

2. The computer-implemented method of claim 1, the method further comprising:
   determining, based on a location of one of the devices on the attack path, the attack phase.

3. The computer-implemented method of claim 1, the method further comprising:
   determining, based on types of the devices and relationships among the devices, the node conditions.

4. The computer-implemented method of claim 1, wherein the attack case includes an attack detail and a countermeasure for the attack detail.

5. The computer-implemented method of claim 1, wherein the output includes a report of the retrieved attack case in a table format.

6. The computer-implemented method of claim 1, wherein the attack phase includes at least one of an intrusion point, an attack base, or an attack target at the time of the security attack.

7. The computer-implemented method of claim 1, the method further comprising:
   extracting, based on a route search on a graph, the attack path, wherein the graph represents the received first list of devices and the received second list of connection relations among the devices.

8. A system for determining aspects of a security attack on a computer, the system comprises:
   a processor; and
   a memory storing computer-executable instructions that when executed by the processor cause the system to:
      receive a first list of devices and a second list of connection relations among the devices;
      determine, based on the received first list of devices and the received second list of connection relations, an attack path;
      store one or more previous attack paths as at least a part of attack cases in an attack case database, wherein the attack case database associates at least one of the one or more previous attack paths with an attack phase and a node condition at a time of the security attack;
      determine the attack phases and the node conditions of the devices, wherein each of the attack paths comprises a node representing one of the devices;
      retrieve, based on a search in the attack case database using the determined attack phases and the determined node conditions, an attack case associated with the security attack, wherein the attack case relates to one or more of the devices, wherein the determined attack phases include a combination of at least an intrusion point and an attack target, and wherein the attack case includes descriptions of the security attack and a countermeasure for the security attack; and
      provide the retrieved attack case as output.

9. The system of claim 8, the computer-executable instructions when executed further causing the system to:
   determine, based on a location of one of the devices on the attack path, the attack phase.

10. The system of claim 8, the computer-executable instructions when executed further causing the system to:
   determine, based on types of the devices and relationships among the devices, the node conditions.

11. The system of claim 8, wherein the attack case includes an attack detail and a countermeasure for the attack detail.

12. The system of claim 8, wherein the output includes a report of the retrieved attack case in a table format.

13. The system of claim 8, wherein the attack phase includes at least one of an intrusion point, an attack base, or an attack target at the time of the security attack.

14. The system of claim 8, the computer-executable instructions when executed further causing the system to:
   extract, based on a route search on a graph, the attack path, wherein the graph represents the received first list of devices and the received second list of connection relations among the devices.

15. A computer-readable non-transitory recording medium storing computer-executable instructions that when executed by a processor cause a computer system to:
   receive a first list of devices and a second list of connection relations among the devices;
   determine, based on the received first list of devices and the received second list of connection relations, an attack path;
   store one or more previous attack paths as at least a part of attack cases in an attack case database, wherein the attack case database associates at least one of the one or more previous attack paths with an attack phase and a node condition at a time of the security attack;
   determine the attack phases and the node conditions of the devices, wherein each of the attack paths comprises a node representing one of the devices;
   retrieve, based on a search in the attack case database using the determined attack phases and the determined node conditions, an attack case associated with the security attack, wherein the attack case relates to one or more of the devices, wherein the determined attack phases include a combination of at least an intrusion point and an attack target, and wherein the attack case includes descriptions of the security attack and a countermeasure for the security attack; and provide the retrieved attack case as output.

16. The computer-readable non-transitory recording medium of claim 15, the computer-executable instructions when executed further causing the system to:

determine, based on a location of one of the devices on the attack path, the attack phase.

17. The computer-readable non-transitory recording medium of claim 15, the computer-executable instructions when executed further causing the system to:

determine, based on types of the devices and relationships among the devices, the node conditions.

18. The computer-readable non-transitory recording medium of claim 15, wherein the retrieved attack case includes an attack detail of the security attack and a countermeasure for the attack detail; and wherein the output includes a report of the retrieved attack case in a table format.

19. The computer-readable non-transitory recording medium of claim 15, wherein the attack phase includes at least one of an intrusion point, an attack base, or an attack target at the time of the security attack.

20. The computer-readable non-transitory recording medium of claim 15, the computer-executable instructions when executed further causing the system to:

extract, based on a route search on a graph, the attack path, wherein the graph represents the received first list of devices and the received second list of connection relations among the devices.

* * * * *